United States Patent
Murphy et al.

(10) Patent No.: US 9,476,962 B2
(45) Date of Patent: Oct. 25, 2016

(54) DEVICE, SYSTEM AND METHODS USING ANGLE OF ARRIVAL MEASUREMENTS FOR ADS-B AUTHENTICATION AND NAVIGATION

(71) Applicant: The Boeing Company, Chicago, IL (US)

(72) Inventors: Timothy Allen Murphy, Everett, WA (US); William Matthew Harris, Seattle, WA (US)

(73) Assignee: THE BOEING COMPANY, Chicago, IL (US)

( * ) Notice: Subject to any disclaimer, the term of this patent is extended or adjusted under 35 U.S.C. 154(b) by 754 days.

(21) Appl. No.: 13/875,749

(22) Filed: May 2, 2013

(65) Prior Publication Data
US 2014/0327581 A1 Nov. 6, 2014

(51) Int. Cl.
| G01S 5/02 | (2010.01) |
| G01S 3/04 | (2006.01) |
| G01S 3/46 | (2006.01) |
| G01S 5/00 | (2006.01) |
| G01S 5/08 | (2006.01) |

(52) U.S. Cl.
CPC ............ *G01S 3/043* (2013.01); *G01S 3/46* (2013.01); *G01S 5/0072* (2013.01); *G01S 5/021* (2013.01); *G01S 5/08* (2013.01)

(58) Field of Classification Search
CPC ........ G01S 3/043; G01S 3/46; G01S 5/0072; G01S 5/021; G01S 5/08
USPC ........................................................ 342/417
See application file for complete search history.

(56) References Cited

U.S. PATENT DOCUMENTS

| 6,473,003 | B2 | 10/2002 | Horvath et al. |
| 6,681,158 | B2 | 1/2004 | Griffith et al. |
| 6,952,631 | B2 | 10/2005 | Griffith et al. |
| 7,342,514 | B1 | 3/2008 | Bailey et al. |
| 7,383,124 | B1 | 6/2008 | Vesel |
| 7,414,567 | B2 | 8/2008 | Zhang et al. |
| 7,423,590 | B2 | 9/2008 | Smith |
| 7,495,612 | B2 | 2/2009 | Smith |
| 7,570,214 | B2 | 8/2009 | Smith et al. |
| 7,730,307 | B2 | 6/2010 | Viggiano et al. |
| 7,761,196 | B2 | 7/2010 | Brandao et al. |
| 7,880,667 | B2 | 2/2011 | Lanzkron |

(Continued)

OTHER PUBLICATIONS

Extended European Search Report from European Application No. 14160782.0 dated Sep. 2, 2014.

*Primary Examiner* — Frank J McGue (57) ABSTRACT

The present disclosure is directed to a receiver for Automatic Dependent Surveillance Broadcast (ADS-B) verification of a target aircraft including a first input for receiving flight tracking information from a target aircraft that indicates positional information of the target aircraft. The receiver further includes a second input for receiving positional and heading information indicating the location and orientation of a multi-element array antenna configured to be attached to the receiver, and a processing module that generates a measured bearing derived from angle of arrival data, and an expected bearing of the target aircraft derived from the indicated positional information of the target aircraft and the positional and heading information defining the receiver location and orientation. A comparator compares the expected bearing to the measured bearing and verifies the ADS-B flight tracking information of the target aircraft and outputs an indication of authenticity based on the verification.

15 Claims, 8 Drawing Sheets

(56) References Cited

U.S. PATENT DOCUMENTS

| | | |
|---|---|---|
| 7,956,795 B2 | 6/2011 | Bruno et al. |
| 7,961,136 B2 | 6/2011 | Stefani et al. |
| 8,004,452 B2 | 8/2011 | Rolfe et al. |
| 8,063,816 B2 | 11/2011 | Troxel |
| 8,072,382 B2 | 12/2011 | Smith et al. |
| 8,102,301 B2 | 1/2012 | Mosher |
| 8,130,135 B2 | 3/2012 | Donovan |
| 8,169,357 B2 | 5/2012 | Bruno et al. |
| 2007/0109190 A1* | 5/2007 | Smith .................. G01S 7/4026 342/359 |
| 2011/0163908 A1* | 7/2011 | Andersson ............ G01S 5/0072 342/36 |
| 2012/0223811 A1* | 9/2012 | Wild ........................ G01S 3/48 340/10.1 |
| 2012/0299763 A1* | 11/2012 | Ryan ........................ G01S 5/08 342/37 |

* cited by examiner

DEVICE, SYSTEM AND METHODS USING ANGLE OF ARRIVAL MEASUREMENTS FOR ADS-B AUTHENTICATION AND NAVIGATION

TECHNICAL FIELD

The technical field of the embodiments presented herein is directed toward a time multiplexed antenna array in conjunction with software based receiver technology to enable Angle of Arrival (AOA) measurements of signals of opportunity in the 960-1215 MHz band. Use of these AOA measurements allows for authentication of Automatic Dependent Surveillance Broadcast (ADS-B) transmissions from other airplanes thereby making the undetected spoofing of received ADS-B signals difficult. In addition, the use of AOA measurements on signals from a variety of systems already operating in the 960-1215 MHz band enables an independent navigation capability which provides an alternative to satellite navigation.

BACKGROUND

ADS-B is a surveillance technology for tracking aircraft as part of the Next Generation Air Transportation System and will be replacing some ground-based radar systems as the primary surveillance method for controlling aircraft. ADS-B enhances safety by making an aircraft visible, real-time, to Air Traffic Control (ATC) and to other appropriately equipped ADS-B aircraft with position and velocity data transmitted every second. ADS-B also provides the data infrastructure for inexpensive flight tracking, planning, and dispatch.

ADS-B uses conventional Global Navigation Satellite System (GNSS) technology and a relatively simple broadcast communications data-link (ADS-B unit) as its fundamental components. ADS-B consists of two different services, a transmitted "ADS-B Out" signal and a received "ADS-B In" signal. There are two types of certified ADS-B data links, but the one most commonly used by commercial air transport airplanes operates at 1090 MHz, essentially a modified Mode S transponder. The other ADS-B standard currently in use is known as Universal Access Transceiver (UAT) and operates at 978 MHz. The International Civil Aviation Organization (ICAO) has promulgated standards for both these systems and a third system (so called VHF data link Mode 4) that operates in the VHF frequency band (118-136). The description of the invention herein considers only the ADS-B systems operating in the USA (i.e. Mode-S extended squitter at 1090 MHz and UAT at 978 MHz). However, the general principles can be applied at any frequency band and could be applied to other ADS-B systems such as VDL Mode-4.

An ADS-B capable aircraft uses an ordinary GNSS (GPS, GLONASS, Galileo, etc.) receiver to derive its precise position from the GNSS constellation and then combines that position with aircraft state information, such as speed, heading, altitude and flight number. This information is then simultaneously broadcast via the "ADS-B Out" signal to other ADS-B capable aircraft and to ADS-B ground, or satellite communications transceivers which then relay the aircraft's position and additional information to ATC centers in real time.

However, ADS-B includes no provisions for authenticating ADS-B signals received from transmitting sources. Spoofing ADS-B signals is relatively simple and may limit the ultimate usefulness of ADS-B. GNSS jamming devices are widely available and ADS-B spoofing may be done with off-the-shelf equipment. Ground systems can use multilateration or cross check with radar systems to detect bogus ADS-B reports. However, both of these options have significant costs. It is with respect to these and other considerations that the disclosure herein is presented.

SUMMARY

It should be appreciated that this Summary is provided to introduce a selection of concepts in a simplified form that are further described below in the Detailed Description. This Summary is not intended to be used to limit the scope of the claimed subject matter.

In one embodiment disclosed herein, an aircraft receiver for ADS-B verification of a target aircraft includes a first input for receiving ADS-B flight tracking information from the target aircraft at the receiver. The ADS-B flight tracking information includes indicated positional information of the target aircraft. The aircraft receiver further includes a second input for receiving positional information and heading information indicating the location and orientation of a multi-element array antenna configured to be attached to the receiver. The aircraft receiver further includes a processing module that generates a measured bearing derived from angle of arrival data, and an expected bearing of the target aircraft. The expected bearing of the target aircraft is derived from the indicated positional information of the target aircraft and the positional information and heading information defining the receiver location and orientation. The processing module further includes a comparator for comparing the expected bearing to the measured bearing and verifies the ADS-B flight tracking information of the target aircraft. The aircraft receiver further includes an output device for outputting an indication of authenticity based on verifying the ADS-B flight tracking information of the target aircraft.

In another embodiment disclosed herein, a system for ADS-B verification includes an antenna array assembly having a multiple-element antenna array for receiving ADS-B signals from a target aircraft, where the ADS-B signals include indicated positional data. The system further includes a receiver configured to receive the ADS-B signals from the antenna array assembly and to measure an angle of arrival of the ADS-B signals relative to the orientation of the antenna array assembly. The receiver further includes a first input for receiving ADS-B flight tracking information from the target aircraft at the receiver, where the ADS-B flight tracking information includes indicated positional information of the target aircraft. The receiver further includes a second input for receiving positional information and heading information indicating the location and orientation of the receiver. The receiver further includes a processing module generating a measured bearing derived from angle of arrival data, and an expected bearing of the target aircraft derived from the indicated positional information of the target aircraft and the positional information and heading information defining a location and orientation of a multi-element array antenna configured to be attached to the receiver. The receiver further includes a comparator for comparing the expected bearing to the measured bearing and verifying the ADS-B flight tracking information of the target aircraft. An output device then outputs an indication of authenticity based on verifying the ADS-B flight tracking information of the target aircraft.

In another embodiment disclosed herein a method of measuring an Angle of Arrival (AOA) includes cycling a commutating solid state switch between each antenna element of a multi-element array antenna based on a synchronization signal received from an analog-to-digital (A/D) converter of a receiver. The method then proceeds to receive at least one signal at the multi-element array antenna and converts the at least one signal at the A/D converter into a plurality of antenna element specific digital samples for each discrete signal. The method then proceeds to de-multiplex the plurality of antenna element specific digital samples into discrete digital data streams for each antenna element of the multi-element array antenna, and proceeds to determines a measured AOA of the at least one signal based on measuring a relative phase of a carrier signal identified in each discrete digital data stream of the respective antenna elements of the commutating multi-element array antenna.

The features, functions, and advantages that have been discussed can be achieved independently in various embodiments of the present disclosure or may be combined in yet other embodiments, further details of which can be seen with reference to the following description and drawings.

BRIEF DESCRIPTION OF THE DRAWINGS

The embodiments presented herein will become more fully understood from the detailed description and the accompanying drawings, wherein.

DETAILED DESCRIPTION

The following detailed description is directed to a time multiplexed antenna array used in conjunction with a software based receiver to enable Angle of Arrival (AOA) measurements of signals of opportunity in the 960-1215 MHz band. Use of these AOA measurements allows for both the authentication of ADS-B transmissions from other aircraft to detect spoofing of ADS-B signals, and allows for independent navigation using received signals-of-opportunity from a variety of systems already operating in the 960-1215 MHz band to provide an alternative to satellite navigation.

The device and method embodiments presented herein address two issues with ADS-B, the first being that currently ADS-B broadcasts have no built in security or authentication capability. This leaves the system vulnerable to spoofing attacks where a bad actor can broadcast false airplane position reports that may cause false alerts in airborne or ground systems. Ground based systems may include some additional sensing capability, (e.g., radar or multi-lateration), to address this type of attack. However, such systems are expensive to implement and maintain. Also, no similar airborne alternative exists. The embodiments presented herein provide a means of authenticating an ADS-B signal being broadcast from a transmitter with the correct relative bearing to the position included in the position report.

The second problem is that air traffic management systems are becoming increasing dependent on Global Navigation Satellite Systems (GNSS) or Satellite Navigation (SatNav) technologies like Global Positioning Systems (GPS). However, these technologies may be jammed with RF interference and can possibly be spoofed to give erroneous results. The embodiments presented herein enable a completely independent navigation capability using existing signals of opportunity broadcast in the 960-1215 MHz band. An airborne receiver using this technique can determine the relative bearing to a variety of ground based transmitters including Distance Measuring Equipment (DME) stations, ADS-B rebroadcast stations, secondary surveillance radar, Universal Access Transceiver (UAT) ground stations, ADS-B re-broadcast stations, etc. By combing several bearing measurements with information about the known locations of the transmitters (carried in an on-board database) the user's position can be determined. Such angle measurements may also be combined with GNSS measurements, inertial measurements or other navigation measurements in a suitably designed Kalman filter or other type of estimation algorithm in order to enhance fault detection and mitigation capabilities. In this way, spoofing of GNSS can be detected and the potential impact of undetected spoofing attacks limited.

Figure 1:
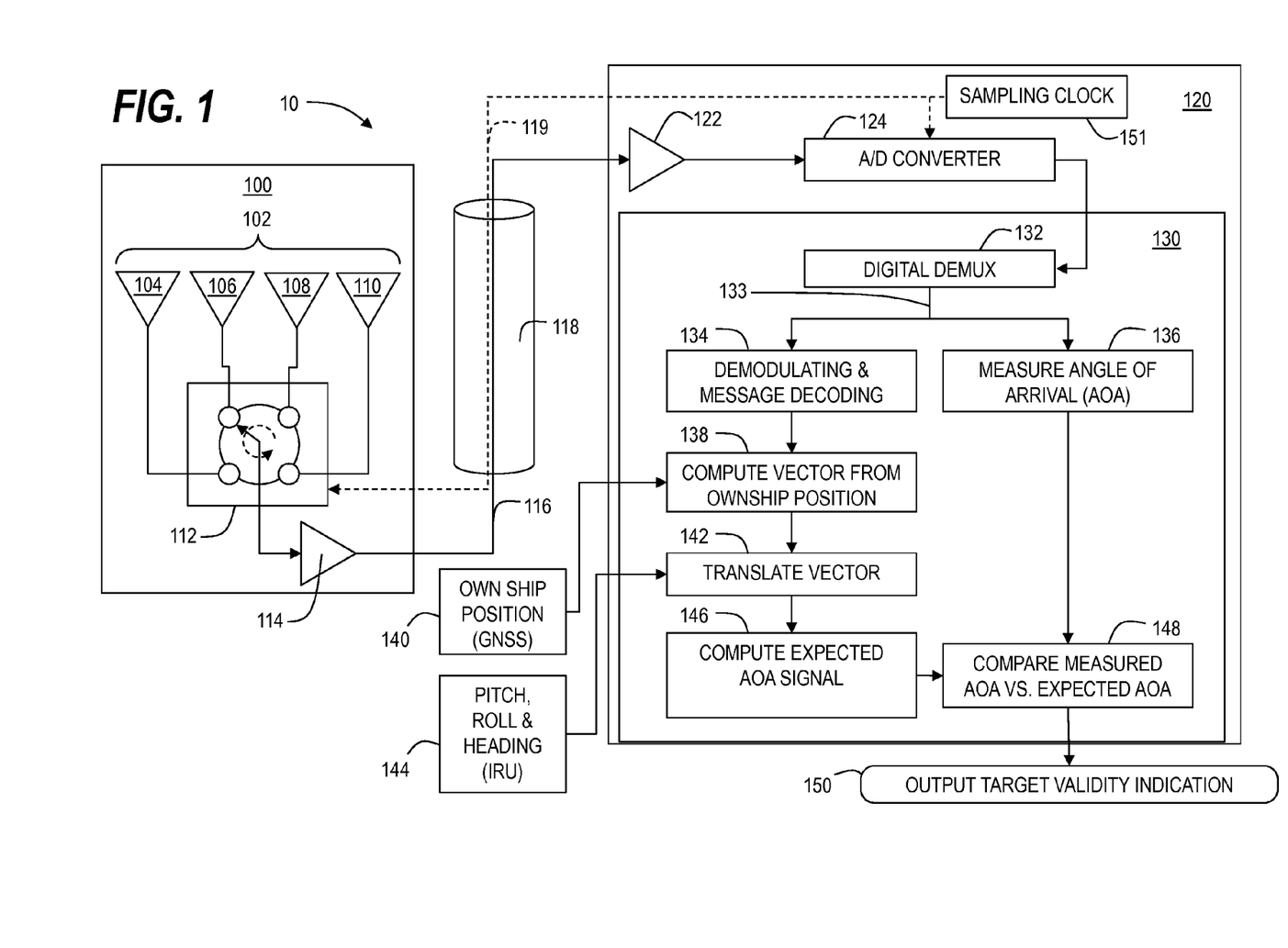
FIG. 1 illustrates a schematic component diagram of an antenna array assembly and a receiver according to at least one embodiment disclosed herein.

FIG. 1 illustrates a first embodiment presented herein including a receiver system 10 having a combination of an antenna array assembly 100 and a receiver subsystem 120. The antenna array assembly 100 consists of a number of antenna elements 102, at least two or more, (here, four being 104, 106, 108 and 110), being arranged in a geometric pattern, (not shown), for example, a square pattern where the four (4) antenna elements 104-110 are arranged equidistant from adjacent antenna elements. The antenna elements 104-110 are connected to a commutating solid state switch device 112 operable to switch the input of one antenna element 104-110 at a time to the input of a Low Noise Amplifier (LNA) (114) over a period of time to produce an output signal of the antenna array assembly 100. The commutating solid state switch array 112 is constructed such that whenever any given antenna element is connected to the output, all the other antenna elements are connected to a 50 Ohm or other high resistance loads.

The commutating solid state switch device 112 and LNA 114 are powered via a voltage that comes to the antenna array assembly 100 on a center conductor 116 of a single coaxial cable 118 that connects the receiver 120 to the antenna array assembly 100. A timing signal 119, (illustrated by the dashed line passing through the single coaxial cable 118), produced by a sampling clock 151 may also be fed to the antenna via the coaxial cable 116 from the receiver subsystem 120 to the antenna array assembly 100. The timing signal 119 determines the speed at which the commutating switch array switches through each of the antenna elements 102. The timing signal 119 is also provided to the A/D converter 124 to control the sampling times of the converter. The antenna elements 102 and other antenna array assembly elements may be designed to operate on signals in the 960 to 1215 MHz band. However, the RF multiplexing system described here could be generally applied to any frequency band with appropriate design of antenna elements. The result of the antenna array assembly 100 configuration is that RF signals from each of the antenna elements 104-110 are multiplexed onto a single coaxial cable 118 and transmitted (after appropriate amplification as necessary) to the receiver subsystem 120. The switching of the antenna elements 102 is done at a very high rate, (e.g., 10-100 MHz), but at a rate below the Nyquist frequency of the lowest frequency of interest divided by the number of elements, (here four, 104-110), in the array. The embodiments described herein incorporate a system that uses time multiplexing of RF onto the single coaxial cable 118 that enable much simpler installation, i.e., a single coaxial cable between the receiver and antenna array assembly, whereas the current Traffic Collision Avoidance Systems (TCAS) uses four antenna elements using four separate co-axial cables to each independent element in the antenna array.

The receiver system 10 takes the time-multiplexed RF signals from the antenna array assembly 100 and down converts the signals at a down converter 122 to an intermediate frequency. This intermediate signal is then applied to an A/D converter 124 which samples the signal at well above twice the Nyquist frequency of the intermediate signal. Alternatively, if a high enough sampling rate is used, the multiplexed RF signal could be sampled directly without need for down-conversion at the down converter 122. Either way, the principle of operation as described below remains the same. The sampling rate and antenna element switching rate are arranged so that at least one sample of the RF is obtained within the time period that an antenna element (104-110) is attached. After A/D conversion 124, the digital signals are passed to a signal processing apparatus 130 that may process the digital signals in a software and/or hardware domain. The sampled RF signals are then de-multiplexed at a digital de-multiplexer 132 into separate data streams for each of the antenna elements 104-110.

One of the data streams 133 containing a signal of interest from at least one antenna element (104-110) is used at a demodulating and message decoding unit 134 to demodulate the signal of interest to determine position information from a broadcast ADS-B signal. This data-stream 133 is hereafter referred to as the primary sampled signal. The airborne receiver unit 10 receives the own-ship GPS position from an on-board GPS receiver 140 and with the two positions, computes at a vector computing unit 138 a vector between the own-ship position and position indicated in the received ADS-B signal. The airborne receiver 10 also receives the airplane pitch, roll and heading information from the on-board Inertial Reference Unit (IRU) system 144 and translates at a vector translation unit 142 the vector from an earth reference frame to an airplane reference frame. Thereafter, an expected AOA signal "$\theta e$" is computed at a computed AOA unit 146 from the received ADS-B position.

Therefore, the orientation of the antenna array assembly 100 is directly responsible for determining the location and orientation of the platform that carries the airborne receiver unit 10. The receiver unit 120 may have any orientation inside the vehicle; however, the orientation in space of the antenna array assembly 100 must be known to compute the expected AOA of the target aircraft broadcasting the respective ADS-B signal.

The sampled 'copies' of the primary signal 133 from the other antenna elements are processed in parallel with the expected AOA signal calculation and are used to measure at an AOA measuring unit 136 a relative angle of arrival (AOA) of the signal of interest. The primary signal 133 can be used to detect the existence of a pulsed signal, such as an ADS-B report or Distance Measuring Equipment (DME) reply pulses. Then, when a period of signal presence is verified, the relative phase of the carrier between each of the sampled antenna element signals is measured using a phase comparator realized in a digital signal processing algorithm. The phase of each signal can be determined using a Costas loop and a digital reference oscillator, or by many other well know means. The exact frequency for the digital reference oscillator can be determined by Fast Fourier Transform (FFT) block processing of the sampled signal. The measured AOA signal "$\theta m$" can then be determined from the relative phase of the signal on each antenna element and based on knowledge of the geometry of the antenna elements. The geometry of the antenna elements may be designed in order to better facilitate the AOA measurements. Having both the measured AOA and the expected AOA, these values are compared in an AOA comparing unit 148 to output a target validity indication 150 regarding the validity of the target ADS-B positional information.

Figure 2:
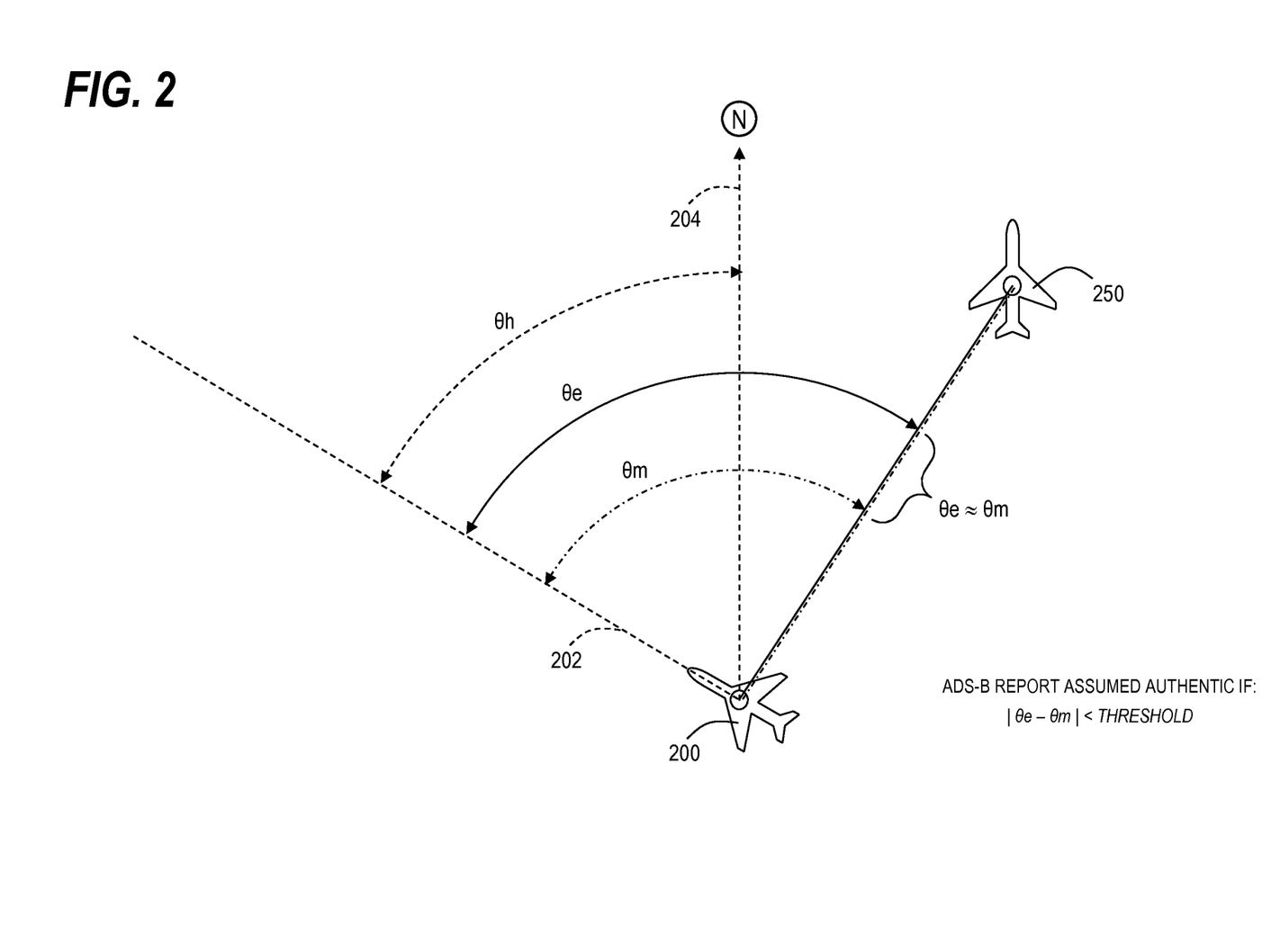
FIG. 2 illustrates a schematic diagram of verifying an authentic ADS-B signal according to at least one embodiment disclosed herein.
Figure 3:
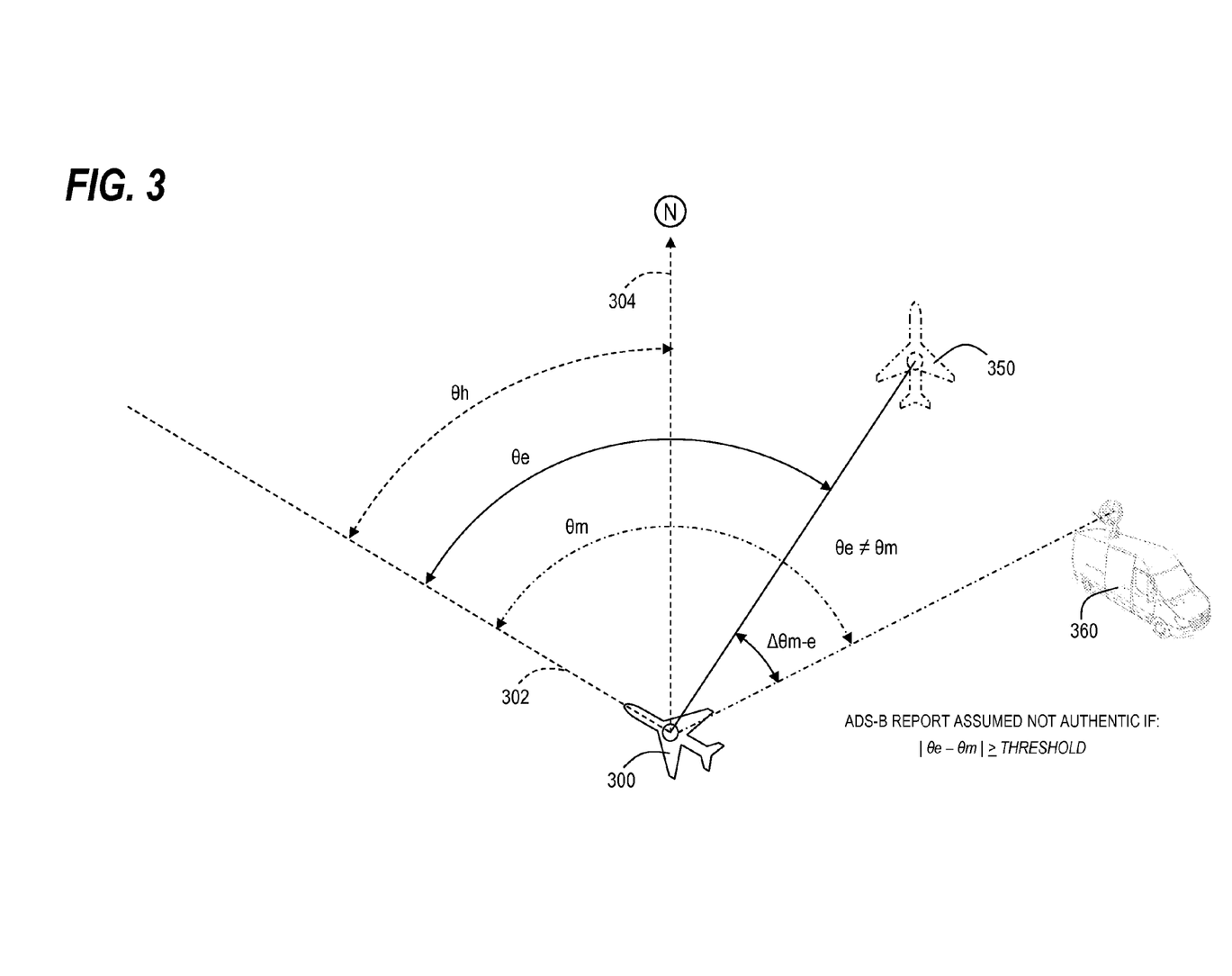
FIG. 3 illustrates a schematic diagram of detecting a non-authentic ADS-B signal according to at least one embodiment disclosed herein.
Figure 4:
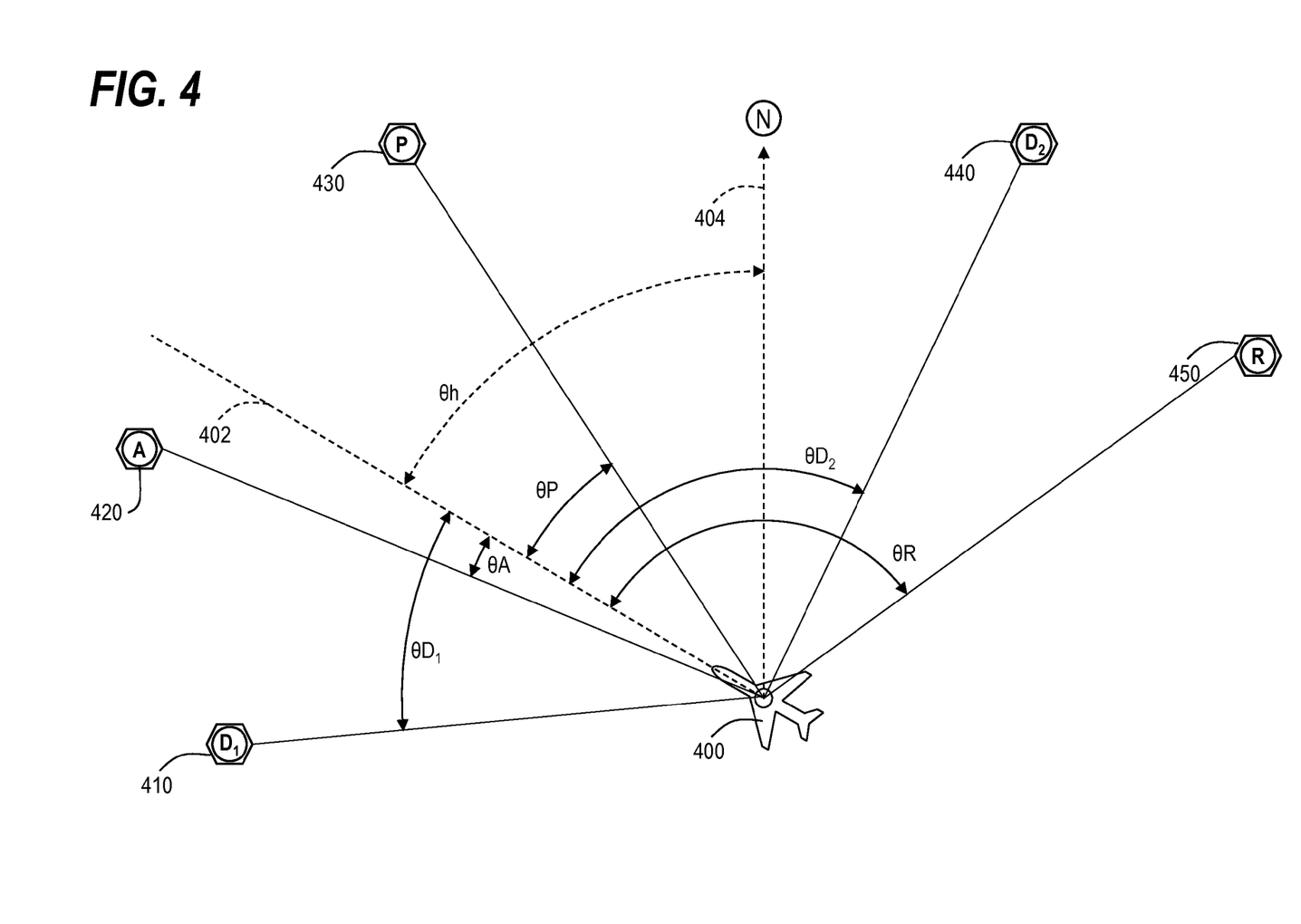
FIG. 4 illustrates a schematic diagram of a receiver system used to determine an independent position fix according to at least one embodiment disclosed herein.

Therefore, the AOA may be determined for any signal that has a relatively stable carrier frequency. In one embodiment presented herein, the AOA measurements may be made for two different purposes: 1) to provide confirmation of the source of an ADS-B report as shown in FIGS. 2-3; and, 2) to use AOA measurements from a variety of ground based transmitters in the 960 to 1215 MHz band to create an independent position solution as shown in FIG. 4. Given sufficient processing power and judicious choice of intermediate frequency and sampling rates, both of these functions described herein can be simultaneously supported by the system illustrated by receiver 10 of FIG. 1. However, a receiver system 10 may also be designed to implement only one of these functions or one function at a time.

FIG. 2 illustrates an aircraft 200 having a heading 202 and a respective heading bearing "$\theta h$" from a North bearing 204. The aircraft receives an ADS-B signal on its airborne receiver unit (similar to receiver 10 of FIG. 1) from a target aircraft 250 with information regarding the purported position of the aircraft 250. The airborne receiver unit 10 demodulates and decodes the ADS-B signal to determine the purported position information of the aircraft 250. The airborne receiver unit 10 further receives the own-ship GPS position and with these two positions computes a vector between the own-ship position and position purported in the received ADS-B signal for aircraft 250. The airborne receiver 10 proceeds to receives own-ship pitch, roll and heading information from an on-board Inertial Reference Unit (IRU) system and translates the vector from an earth reference frame to an airplane reference frame to produce an expected AOA bearing "$\theta e$" from the received ADS-B position.

The receiver 10 simultaneously processes the ADS-B signal received from the aircraft 250 and determines a measured AOA bearing "$\theta m$" from the relative phase of the signal on each antenna element as described above. Any difference between expected AOA bearing $\theta e$ and the measured AOA bearing $\theta m$ to the airplane 250 becomes a detection statistic that can be used in a hypothesis test. The hypothesis is that the ADS-B report actually comes from the location (here target aircraft 250) reported in the ADS-B message. Any difference between the expected AOA bearing $\theta e$ and the measured AOA bearing $\theta m$ is compared to a threshold that is derived based on the accuracy of the AOA measurements such that an acceptable probability of a false detection is achieved. In FIG. 2, since the expected AOA bearing θe to the aircraft 250 and the measured AOA bearing θm to the aircraft 250 are within the tolerance established by the chosen threshold, the receiver 10 may give an indication that the purported location of the aircraft 250 is indeed authentic.

FIG. 3 illustrates an aircraft 300 having a heading 302 and a respective heading bearing θh from a North bearing 304. The aircraft receives an ADS-B signal on its airborne receiver unit (similar to receiver 10 of FIG. 1) from a transmitter 360 with information regarding a purported position of a purported target aircraft 350. The airborne receiver unit 10 demodulates and decodes the ADS-B signal to determine the purported position information of the target aircraft 350. The airborne receiver unit 10 further receives the own-ship GPS position and with these two positions computes a vector between the own-ship position and position purported in the received ADS-B signal for target aircraft 350. The airborne receiver 10 proceeds to receives own-ship pitch, roll and heading information from an onboard Inertial Reference Unit (IRU) system and translates the vector from an earth reference frame to an airplane reference frame to produce an expected AOA signal "θe" from the received ADS-B position.

The receiver 10 simultaneously processes the ADS-B signal received from the transmitter 350 and determines a measured AOA signal "θm" from the relative phase of the signal on each antenna element as described above. In the scenario of FIG. 3, a difference between the expected AOA bearing θe and the measured AOA bearing θm to the airplane 350 is used in the hypothesis test, described above, where the ADS-B report actually comes from the location, (here target aircraft 350), reported in the ADS-B message. The difference Δθm–e between the expected AOA bearing θe and the measured AOA bearing θm is compared to a threshold, and in this scenario, is substantially different enough to trigger an indication or an alarm to be output by the receiver 10 thus giving an indication that the purported location of the aircraft 350 is not authentic, i.e., it is being "spoofed" by a signal transmitted at the location of the transmitter 360. The warning indication output by the receiver 10 may further output an indication that may identify the target aircraft 350 as having an invalid ADS-B signal.

The second application using the measured AOA values includes an alternative position determination system, as illustrated in FIG. 4. Using the techniques described above, AOA measurements based on the relative phase of the carrier between each of the sampled antenna element signals may be made to a variety ground transmitters that are broadcasting signals for a variety of other purposes. These 'signals of opportunity' are numerous and could exist in virtually any band. In the one embodiment described herein, the measurements are made of signals broadcast in the 960 to 1215 MHz band. This band is chosen because these 'signals of opportunity' are broadcast by sources that are provided by aviation service providers in bands that are allocated by the International Telecommunication Union (ITU) for safety of life applications. Hence the acceptance of use of these signals by aviation authorities should be possible. The signals to be used may include but are not limited to the following.

1—Distance Measuring Equipment (DME) reply pulses. These are pulse pairs broadcast by a DME ground station in reply to interrogations by airborne users. The reply pulses may be intended for the airplane that the AOA navigation system resides on, or they may be intended as replies to interrogations from other airplanes. Only the AOA information is used and the timing associated with DME ranging is ignored. DME reply pulses are also generated by a ground station without any associated interrogation pulses in order to keep the duty cycle of the transmitter in an acceptable range.

2—1090 MHz ADS-B Re-broadcast messages, which are ADS-B reports broadcast from the ground telling of airplane positions for airplanes using non-1090 MHz ADS-B.

3—1030 MHz Secondary Surveillance Radar (SSR) interrogations from SSR radars at known locations.

4—Future L-Band Digital Aeronautical Communications System (LDACS) communications transmissions. A proposal exists for a new communication system called LDACS which is intended to exist in the 960-1215 MHz band. It is further proposed that LDACS may provide a range determination function which could easily be accommodated in the envisioned receiver system as well. In addition to the LDACS ranging, this AOA measurement could be applied for further authentication and/or fault detection and mitigation.

5—Future DME band based 'pseudolite signals'. One of the proposals for a future non-GNSS position determination signal is to implement a new ground based ranging source in the DME band. The AOA measurement signals could take advantage of those signals as well should they ever exist.

6—Universal Access Transceiver (UAT) ground station transmissions. One of the standards for ADS-B used in the United States includes ground based transmissions at 978 MHz. The UAT technology allows additional information to be uplinked to aircraft from ground stations through FIS-B (Flight Information System—Broadcast). This information includes weather and Temporary Flight Restriction (TFR) information.

FIG. 4 illustrates the navigation system based on AOA determination where an aircraft 400 with airborne receiver equipment, similar to receiver 10 of FIG. 1, includes a database of known transmitters and their locations. The airborne receiver will select frequencies to examine based on the current estimated position and transmitters that are known to exist in the area. If the position is unknown, the receiver can begin by searching 1030 and 1090 MHz looking for transmissions from fixed locations. Once signals are found there, DME frequencies can be searched until active reply channels are found. Once enough angles to transmitters are known, frequencies are found, and an algorithm can be applied to determine position by looking through all possible combinations of ground stations with the same frequencies and then find a combination for which the AOA measurements result in a self-consistent position. The more ground stations that can be measured, the faster an overdetermined position solution will be produced.

FIG. 4 illustrates an aircraft 400 having a heading 402 and a respective heading bearing θh from a North bearing 404. The receiver on the aircraft 400, (like receiver 10 in FIG. 1), that measures the AOA values may receive a signal from a first DME transponder $D_1$ 410 sending reply pulses to all users and measure an AOA as $\theta D_1$. The receiver on the aircraft 400 may receive a signal from a ground based ADS-B re-transmit source A 420 and measure an AOA for as θA. Similarly, the receiver on the aircraft 400 may receive a signal from a ground based DME transponder P 430 that is paired with a localizer and measure an AOA for as θP. Likewise, the receiver on the aircraft 400 may receive a signal from a second ground based DME transponder $D_2$ 440 sending reply pulses to all users and measure an AOA for as $\theta D_2$. And similarly, the receiver on the aircraft 400 may receive a signal from radar R 450 having a known position and measure an AOA for as θR.

The embodiments described herein are different than other proposed Alternate Position and Navigation and Timing (APNT) systems in that the do not provide precise time transfer to the airborne receiver, but they also do not require precise time synchronization of ground based or airborne assets to operate. The embodiments described herein can produce a position estimate based on bearing measurements only and without range measurements. The embodiments described herein do not require any new ground-based infrastructure, but only airborne equipment. The embodiments described herein may also be used in ground based receivers to provide position determination capability. The embodiments described herein allow for simpler, cheaper ground systems that can provide independent positioning capability.

The embodiments described herein address the above solutions in a relatively simple easy to install receiver package, and solves the lack of ADS-B authentication problem for which there is no other adequate solution proposed for airborne equipment. By combing several bearing measurements with information about the known locations of the transmitters, (carried in an on-board database), the user's position can be determined. Such angle measurements may be combined with GNSS measurements, inertial measurements or other navigation measurements in a suitably designed Kalman filter or other type of estimation algorithm in order to enhance fault detection and mitigation capabilities. In this way, spoofing of GNSS can be detected and the potential impact of undetected spoofing attacks limited.

Figure 5:
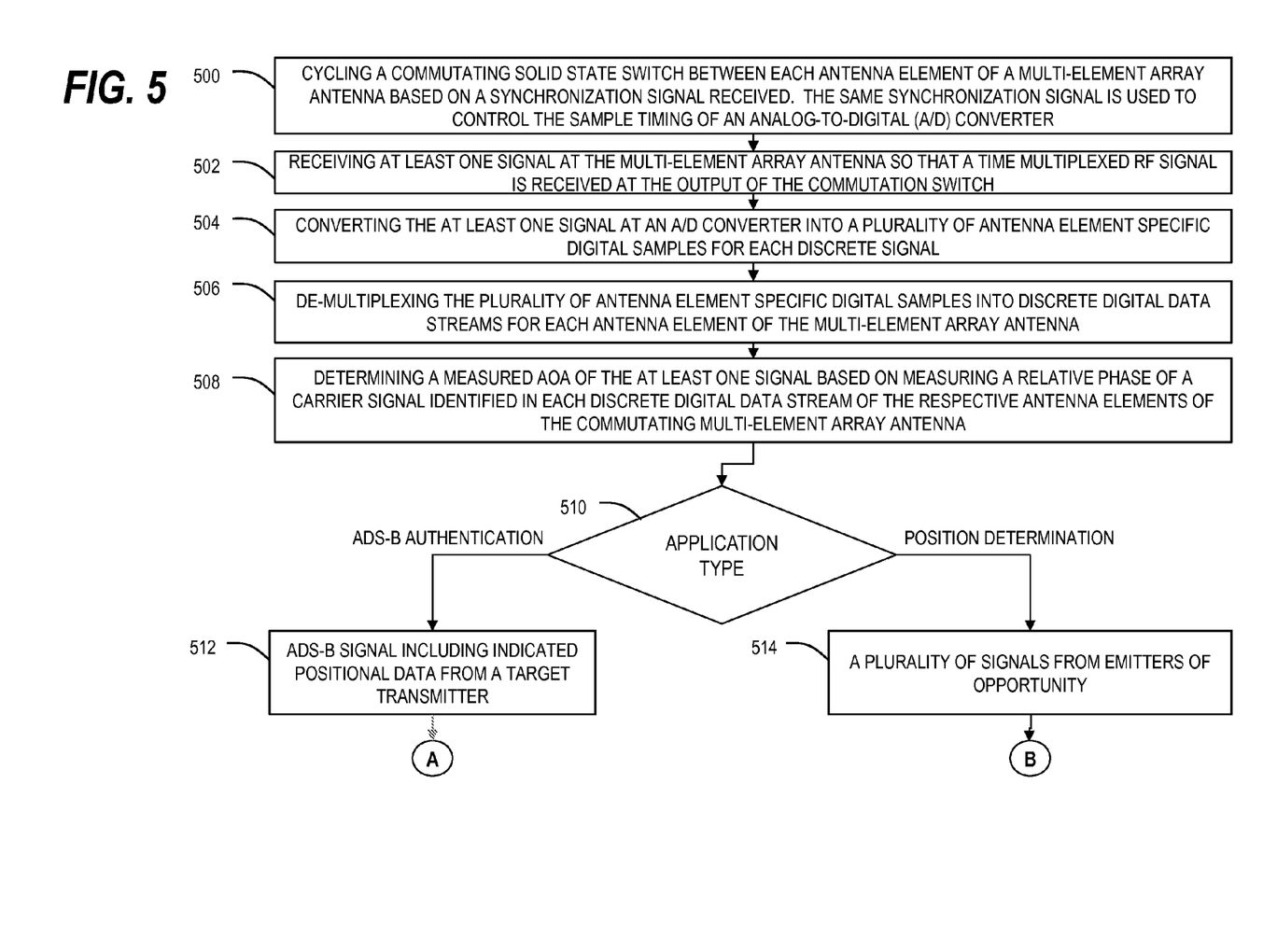
FIG. 5 illustrates a logic flowchart for a method according to at least one embodiment disclosed herein.

FIG. 5 illustrates a logic flowchart for a method of measuring an Angle of Arrival (AOA), including cycling 500 a commutating solid state switch 112 between each antenna element of a multi-element array antenna 102 based on a synchronization signal received from an analog-to-digital (A/D) converter 124 of a receiver system 10. At least one signal is received 502 at the multi-element array antenna 102 and the at least one signal proceeds to be converted 504 at an A/D converter 124 into a plurality of antenna element specific digital samples for each discrete signal. The plurality of antenna element specific digital samples proceed to be de-multiplexed 506 into discrete digital data streams for each antenna element of the multi-element array antenna, and thereafter, a measured AOA is determined 508 of the at least one signal based on measuring a relative phase of a carrier signal identified in each discrete digital data stream of the respective antenna elements of the commutating multi-element array antenna.

Figure 6:
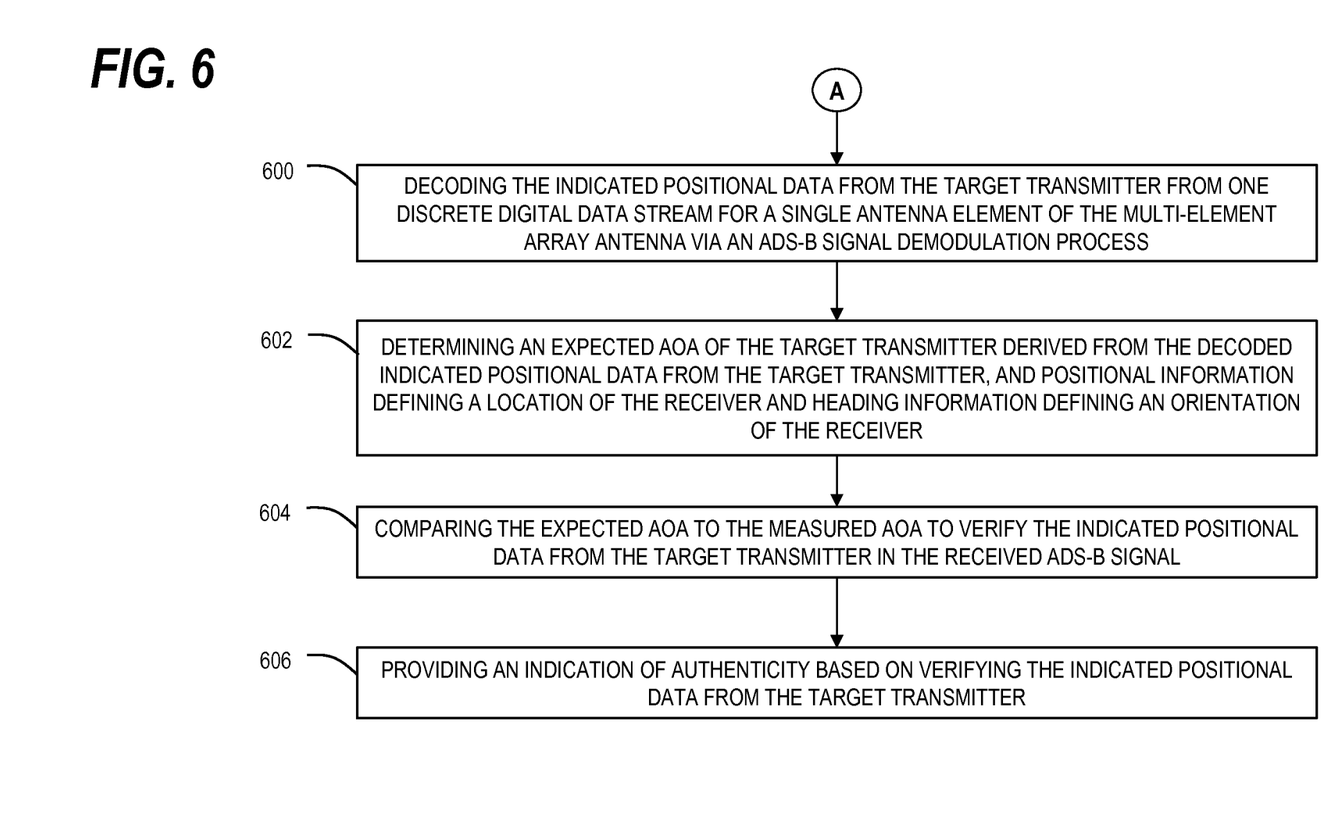
FIG. 6 illustrates a continuation of the logic flowchart from FIG. 5 for a method according to at least one embodiment disclosed herein.

The receiver at 510 may make a determination regarding what type of functional application it assumes to further process the received signals. Since different types of signals are transmitted on different frequencies, the receiver 10 knows the type of signal it processes when it tunes to that particular frequency. Furthermore, the receiver exploits knowledge about the general signal structure when measuring the phase to determine the measured AOA as described above. When the receiver assumes the function of providing ADS-B authentication 512, the ADS-B signal received at the receiver is further processed with antenna array position and orientation information to verify the authenticity of that position information as compared to a measured AOA calculation performed above. FIG. 6 illustrates a continuation of the logic flowchart from FIG. 5 for a method that further decodes 600 the indicated positional data from the target transmitter from one discrete digital data stream for a single antenna element of the multi-element array antenna via an ADS-B signal demodulation process. The expected AOA of the target transmitter proceeds to be determined 602 derived from the decoded indicated positional data from the target transmitter, and positional information defining a location of the receiver system and heading information defining an orientation of the antenna subsystem of the receiver system. The expected AOA proceeds to be compared 604 to the measured AOA to verify the indicated positional data from the target transmitter in the received ADS-B signal. Finally, an indication of authenticity is provided 606 based on verifying the indicated positional data from the target transmitter.

Figure 7:
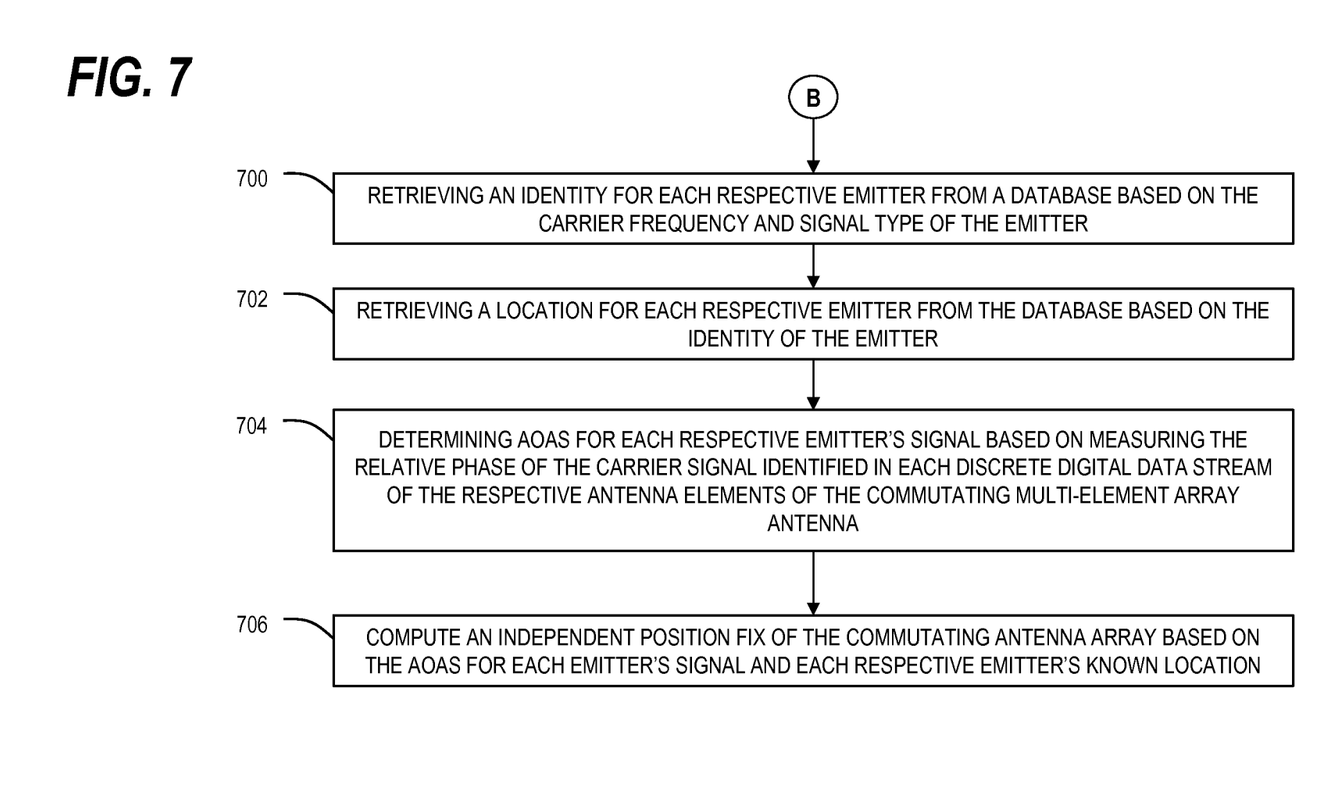
FIG. 7 illustrates a further continuation of the logic flowchart from FIG. 5 for a method according to at least one embodiment disclosed herein.

When the receiver assumes the function of providing navigation and position determination at 510 of FIG. 5, a plurality of signals from emitters of opportunity may be received 514 at the receiver unit 10 for further processing illustrated in FIG. 7 as a continuation of the logic flowchart from FIG. 5. The receiver 10 is able to receive many types of signals simultaneously in the 960-1215 MHz band and may tune to a specific frequency analyze a particular type of signal for use while operating in the navigation and position determining function. The method in this instance includes receiving a plurality signals from at least two ground based emitters. An identity is retrieved 700 for each respective emitter from a database based on the carrier frequency and a signal type of the emitter. Then, a location proceeds to be retrieved 702 for each emitter from the database based on the identity of each respective emitter. AOAs for each respective emitter signal then proceed to be determined 704 based on measuring the relative phase of the carrier signal identified in each discrete digital data stream of the respective antenna elements of the commutating multi-element array antenna. Finally, an independent position fix of the antenna subsystem of the receiver system is computed 706 based on the AOA measurements and each respective emitter location.

Figure 8:
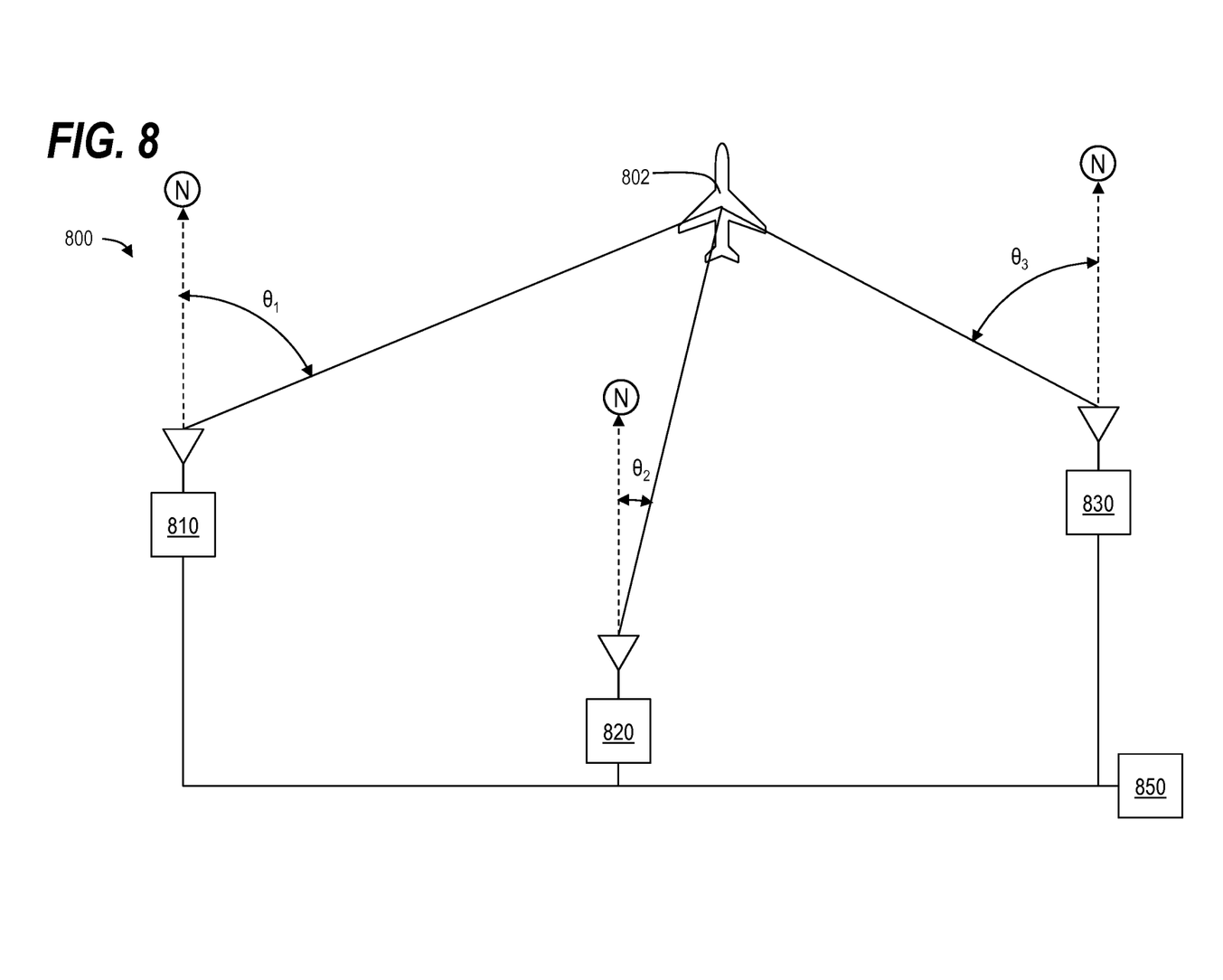
FIG. 8 illustrates a schematic diagram of a ground-based networked receiver system of AOA processors according to at least one embodiment disclosed herein.

FIG. 8 illustrates a schematic diagram of a ground-based system 800 of networked AOA receivers 810-830 and network equipment 850 that process and authenticate ADS-B signals to both provided positional information on aircraft 802 and may detect and locate the source of bad actors or spoofers transmitting ADS-B signals that misrepresent a true position. Based on the principles of the embodiments presented above, the networked ground-based AOA receivers 810-830 may independently determine all aircraft positions, and may thereby act as a "back-up" surveillance system without having any requirement precise time synchronization.

The above implementation may use the known location of ground-based AOA receivers 810-830 and their respective measured bearings $θ_1$-$θ_3$ to airborne targets (e.g., target aircraft 802), to independently determine the target's location. The measured results are compared to the position reported by the target via the ADS-B signal information. Any difference in the measured verses the reported position is applied as test statistic in the classical hypothesis test to detect spoofing of the airborne target. The location of spoofer can thereby be determined without cooperation of the spoofer, and the location of all ADS-B traffic can be independently determined yielding a AOA surveillance backup capability when GPS information is denied or unavailable. The subject matter described above is provided by way of illustration only and should not be construed as limiting. Various modifications and changes may be made to the subject matter described herein without following the example embodiments and applications illustrated and described, and without departing from the true spirit and scope of the present disclosure, which is set forth in the following claims.

The invention claimed is:

1. An aircraft receiver for Automatic Dependent Surveillance Broadcast (ADS-B) verification of a target aircraft, comprising:
a first input for receiving ADS-B flight tracking information from the target aircraft at the receiver, the ADS-B flight tracking information including indicated positional information of the target aircraft;
a second input for receiving positional information and heading information indicating a location and orientation of a multi-element array antenna configured to be attached to the receiver;
a processing module operative to:
generate a measured bearing derived from angle of arrival data, and
generate an expected bearing of the target aircraft derived from the indicated positional information of the target aircraft and the positional information and heading information defining the location and orientation;
a comparator for comparing the expected bearing to the measured bearing and verifying the ADS-B flight tracking information of the target aircraft; and
an output device for outputting an indication of authenticity based on verifying the ADS-B flight tracking information of the target aircraft.

2. The aircraft receiver according to claim 1, wherein the processing module being further operative to compute a vector from the location to the target aircraft based on the indicated positional information,
wherein computing the vector being based on receiving the positional information from a Global Navigation Surveillance System (GNSS) indicating the location of the multi-element array antenna.

3. The aircraft receiver according to claim 2, wherein the processing module being further operative to translate the vector from an earth reference frame to an airplane reference frame based the heading information including pitch, roll and heading data generated from an Inertial Reference Unit (IRU) indicating the orientation of the multi-element array antenna.

4. The aircraft receiver according to claim 1, wherein the processing module being further operative to generate the measured bearing based on measuring a relative phase of a carrier signal identified in the first input.

5. The aircraft receiver according to claim 1, further comprising an Analog-to-Digital (A/D) converter for processing signals received on the first input,
wherein the A/D processing transmits a synchronizing signal to a commutating multiple-element array antenna that feeds the signals to the first input.

6. A receiver for Automatic Dependent Surveillance Broadcast (ADS-B) verification, comprising:
a processing module receiving an ADS-B signal from a target aircraft including indicated positional data, and operative to:
generate a measured bearing derived from detection of an angle of arrival of the ADS-B signal, and
generate an expected bearing of the target aircraft derived from the indicated positional data of the ADS-B signal, and positional and heading information of a location and orientation of a multi-element array antenna configured to be attached to the receiver;
a comparator for comparing the expected bearing to the measured bearing and for verifying the ADS-B indicated positional data of the target aircraft; and
an output device for outputting an indication of authenticity based on verifying the ADS-B indicated positional data of the target aircraft.

7. The receiver according to claim 6, wherein the processing module being further operative to compute a vector from the location to the target aircraft based on the indicated positional data,
wherein computing the vector being based on receiving the positional information from a Global Navigation Satellite System (GNSS) indicating the location of the multi-element array antenna.

8. The receiver according to claim 7, wherein the processing module being further operative to translate the vector from an earth reference frame to an airplane reference frame based the heading information including pitch, roll and heading data generated from an Inertial Reference Unit (IRU) indicating the orientation of the multi-element array antenna.

9. The receiver according to claim 6, wherein the processing module being further operative to generate the measured bearing based on measuring a relative phase of a carrier signal of the ADS-B signal from the target aircraft.

10. The receiver according to claim 6, further comprising an Analog-to-Digital (A/D) converter processing ADS-B signals received from the target aircraft,
wherein the A/D processing is synchronized to a commutating multiple-element array antenna feeding the ADS-B signals to the receiver.

11. A system for automatic dependent surveillance broadcast (ADS-B) verification, comprising:
an antenna array assembly having a multiple-element antenna array for receiving ADS-B signals from a target aircraft, the ADS-B signals including indicated positional data; and
a receiver configured to receive the ADS-B signals from the antenna array assembly and to measure an angle of arrival of the ADS-B signals relative to an orientation of the antenna array assembly, wherein the receiver comprises:
a first input for receiving ADS-B flight tracking information from the target aircraft at the receiver, the ADS-B flight tracking information including indicated positional information of the target aircraft;
a second input for receiving positional information and heading information indicating a location and orientation of the receiver;
a processing module operative to:
generate a measured bearing derived from angle of arrival data, and
generate an expected bearing of the target aircraft derived from the indicated positional information of the target aircraft and the positional information and heading information defining the location and orientation; and
a comparator for comparing the expected bearing to the measured bearing and verifying the ADS-B flight tracking information of the target aircraft; and
an output device for outputting an indication of authenticity based on verifying the ADS-B flight tracking information of the target aircraft.

12. The system according to claim 11, where the antenna array assembly further comprises a commutating solid state switch that cycles between each antenna element of a multi-element array antenna.

13. The system according to claim 12, where the receiver further comprises an analog-to-digital (A/D) converter that receives the ADS-B signals and controls cycling of the commutating solid state switch with a synchronization signal.

14. The system according to claim 11, wherein the processing module being further operative to decode the indicated positional data from a target transmitter from one discrete digital data stream for a single antenna element of the multiple-element antenna array via an ADS-B signal demodulation process; and     determine an expected AOA of the target transmitter derived from the decoded indicated positional data from the target transmitter, and positional information defining the location of the receiver and heading information defining the orientation of the antenna array assembly.

15. The system according to claim 14, wherein the processing module being further operative to compare the expected AOA to the measured AOA to verify the indicated positional data from the target transmitter in the received ADS-B signal; and     provide an indication of authenticity based on verifying the indicated positional data from the target transmitter.

* * * * *